(12) United States Patent
Ng (10) Patent No.: US 6,253,279 B1
(45) Date of Patent: *Jun. 26, 2001

(54) METHOD AND SYSTEM FOR DETERMINING THE DATA LAYOUT GEOMETRY OF A DISK DRIVE

(75) Inventor: Spencer W. Ng, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/126,746

(22) Filed: Jul. 31, 1998

(51) Int. Cl.[7] ................................. G06F 12/00
(52) U.S. Cl. ..................... 711/107; 711/111; 710/5
(58) Field of Search .................. 711/100, 111, 711/112, 107, 168, 4; 360/48, 78.04, 78.14, 54; 386/27; 710/5; 714/47

(56) References Cited

U.S. PATENT DOCUMENTS

| | | | |
|---|---|---|---|
| 4,935,825 | * 6/1990 | Worrell et al. | 360/54 |
| 5,636,075 | * 6/1997 | Nishimura et al. | 360/48 |
| 5,740,358 | * 4/1998 | Geldman et al. | 714/47 |
| 5,751,883 | * 5/1998 | Ottesen et al. | 386/27 |
| 5,784,220 | * 7/1998 | Nishimura et al. | 360/78.14 |
| 5,854,941 | * 12/1998 | Ballard et al. | 710/5 |
| 6,026,463 | * 2/2000 | Klein | 711/4 |

FOREIGN PATENT DOCUMENTS

404146573A * 5/1992 (JP).
404146574A * 5/1992 (JP).

OTHER PUBLICATIONS

IBM Technical Disclosure Bulletin, Adaptive Skew Optimization, Oct. 1995, pp. 559–562.*
Worthington et al., "On–Line Extraction of SCSI Disk Drive Parameters", 1995, 146–156.*
Aboutabl et al., "Temporally Determinate Disk Access: An Experimental Approach", 1998.*

* cited by examiner

Primary Examiner—Reginald G. Bragdon
Assistant Examiner—Brian R. Peugh
(74) Attorney, Agent, or Firm—Morgan & Finnegan LLP (57) ABSTRACT

A system and method for determining the disk drive parameters of any disk drive that may be encountered. A novel access pattern is applied to the disk drive and a novel technique used to interpret the measured results. In order to determine a data layout geometry of a disk drive, a plurality of sectors on the disk drive are accessed in sequentially decreasing order, starting from an initial sector. A completion time for each access is measured and parameters related to the data layout geometry of the disk drive are determined based on the measured access times. In order to determine the layout geometry, sectors immediately preceding track and cylinder skews are identified and a number of sectors per track and a number of tracks per cylinder are determined based on the identified sectors.

36 Claims, 7 Drawing Sheets

METHOD AND SYSTEM FOR DETERMINING THE DATA LAYOUT GEOMETRY OF A DISK DRIVE

FIELD OF THE INVENTION

The present invention relates to a method of determining the data layout geometry of a disk drive by applying a novel access pattern and interpretation of the measured results.

BACKGROUND OF THE INVENTION

Modern disk drives store data in blocks with a fixed size. The physical block in a drive are termed sectors. The sectors are arranged in tracks, each track having a fixed number of sectors, and the tracks are arranged in cylinders. Many of today's magnetic disk drives employ zone recording, where all tracks within a zone have the same number of sectors per track. The sectors may be skewed from track to track and from cylinder to cylinder.

These disk drive parameters, namely, a number of tracks per cylinder, number of zones, number of sectors per track in each zone, track skew, and cylinder skew, define the data layout geometry of a disk drive. These parameters affect the performance characteristics of a disk drive. An additional parameter that affects the disk drive performance is the drive's rotational speed. A need arises for a technique with which these disk drive parameters may be quickly and easily determined, for any disk drive encountered.

SUMMARY OF THE INVENTION

The present invention is a system and method for determining the disk drive parameters of any disk drive that may be encountered. By applying a special access pattern to the disk drive and a special technique of interpreting the measured results, the present invention can determine the number of data tracks per cylinder, the number of recording zones, number of sectors per track in each zone, the track skew, the cylinder skew, and the rotational speed of the disk drive.

In order to determine a data layout geometry of a disk drive, a plurality of sectors on the disk drive are accessed in sequentially decreasing order, starting from an initial sector. A completion time for each access is measured and parameters related to the data layout geometry of the disk drive are determined based on the measured access times. In order to determine the layout geometry, sectors immediately preceding track and cylinder skews are identified and a number of sectors per track and a number of tracks per cylinder are determined based on the identified sectors.

In order to identify the sectors, an average completion time of all measured access times is determined. All measured access times that are less than the average completion time by at least a predefined threshold are identified. A standard completion time, which is an average of all measured access times, excluding those measured access times that are less than the average completion time by at least the predefined threshold, is determined. Logical block addresses corresponding to the measured access times that are less than the average completion time by at least the predefined threshold are identified. A skew time for each identified logical block address is determined by subtracting the measured access time for the logical block address from the standard reference time and each skew time is identified as either a track skew or a cylinder skew based on the size of the skew time.

A number of sectors per track is determined based on a sector distance between identified sectors immediately preceding track skews and a number of tracks per cylinder is determined based on a number of tracks between identified sectors immediately preceding cylinder skews. A rotational speed of the disk drive is determined based on the determined number of sectors per track and the determined standard reference time in accordance with:

$$\mathrm{rpm}=60\times(S-1)/(S\times T),$$

where rpm is the rotational speed of the disk drive, S is the number of sectors per track and T is the standard reference time.

In another embodiment of the present invention, a zone layout of the disk drive is determined by repeatedly determining a number of sectors per track at a plurality of locations on the disk drive. Each determination is made using a different initial sector sector. The initial sector to be used for each determination is selected from the set $\{0, W/X, 2W/X, 3W/X, \ldots, (X-1)W/X\}$, wherein W is the maximum logical block address of the disk drive and X is a positive integer.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
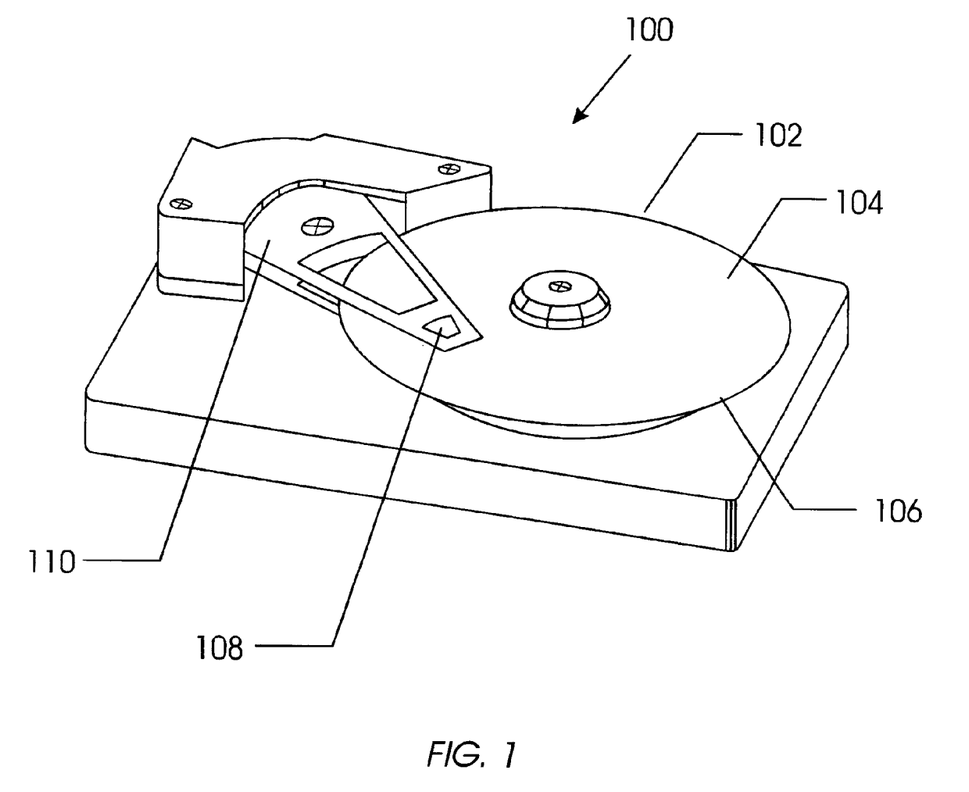
FIG. 1 shows a typical conventional disk drive.

A typical conventional disk drive 100 is shown in FIG. 1. Disk drive 100 includes at least one disk 102, upon which data is recorded. Disk 102 may be a rigid disk, as shown, or it may be a floppy disk. Data may be recorded magnetically, optically, or magneto-optically. There may be only one disk 102, as shown, or there may be a plurality of disks, typically arranged in a coaxial stack. Each disk 102 has two surfaces 104 and 106. On some disks, such as that shown, data may be recorded on both surfaces, while, on other disks, data may be recorded only on one surface. Data is written to, and read from, disk 102 by head 108, which includes a mechanism and circuitry appropriate for the recording technique used. There is at least one head for each surface on which data is recorded. Head 108 is moved across the surface of disk 102 by actuator 110. Typically, all heads are moved simultaneously by the actuator.

Figure 2:
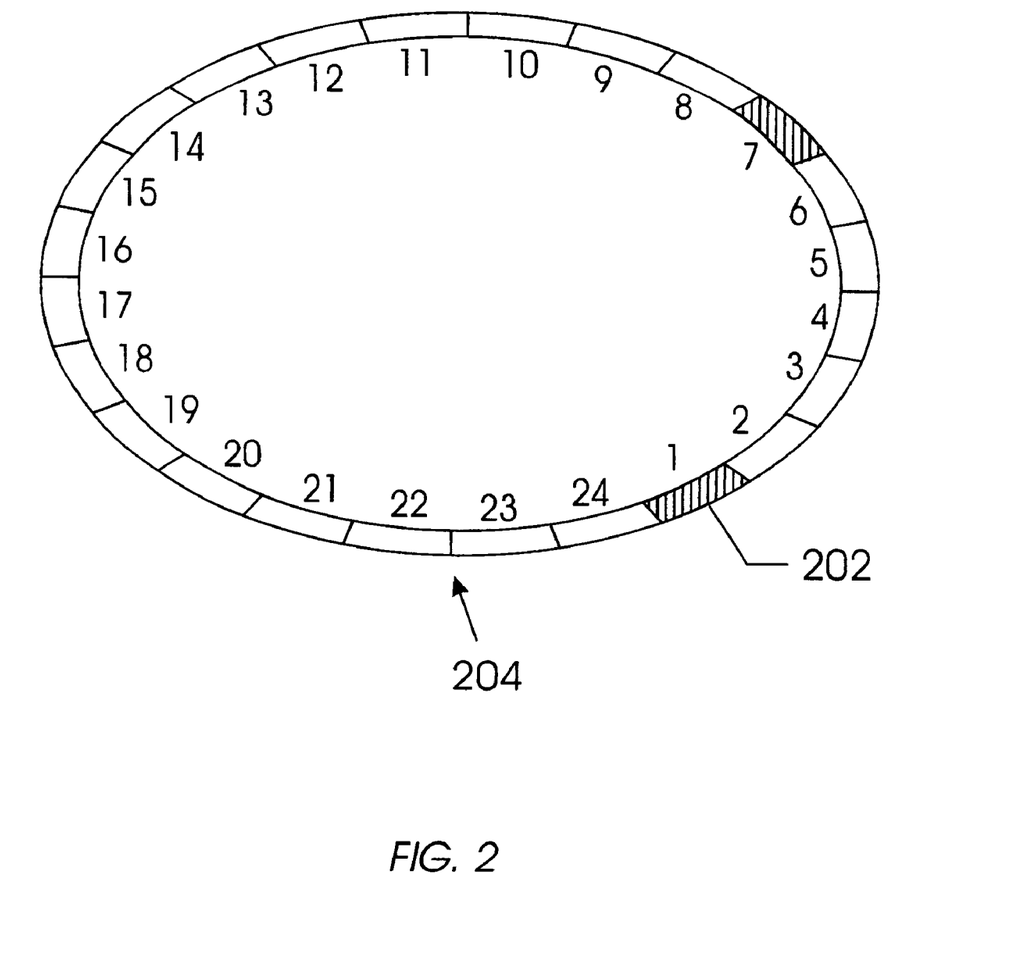
FIG. 2 shows a typical organization of data recorded on a track in the disk drive shown in FIG. 1.

The organization of data recorded on a disk drive, such as drive 100, is shown in FIG. 2. Typically, data is stored on a disk in fixed size blocks. The physical blocks on a disk are referred to as sectors, such as sector 202, shown in FIG. 2. The sectors that pass under a recording head during one revolution of the disk are called a track, such as track 204. Typically, physical sectors are mapped to logical sectors or block, and logical blocks are manipulated by the host computer system.

In a common data layout for magnetic disk drives, the first logical block (with a Logical Block Address or LBA of 1) is located on the first physical track (accessed by recording head 1) at the outermost diameter of the first recording surface. The next logical block 2 is physically the next sector that follows LBA 1. This continues until the end of the track is reached. In the example of FIG. 2 there are 24 sectors per track.

Figure 3:
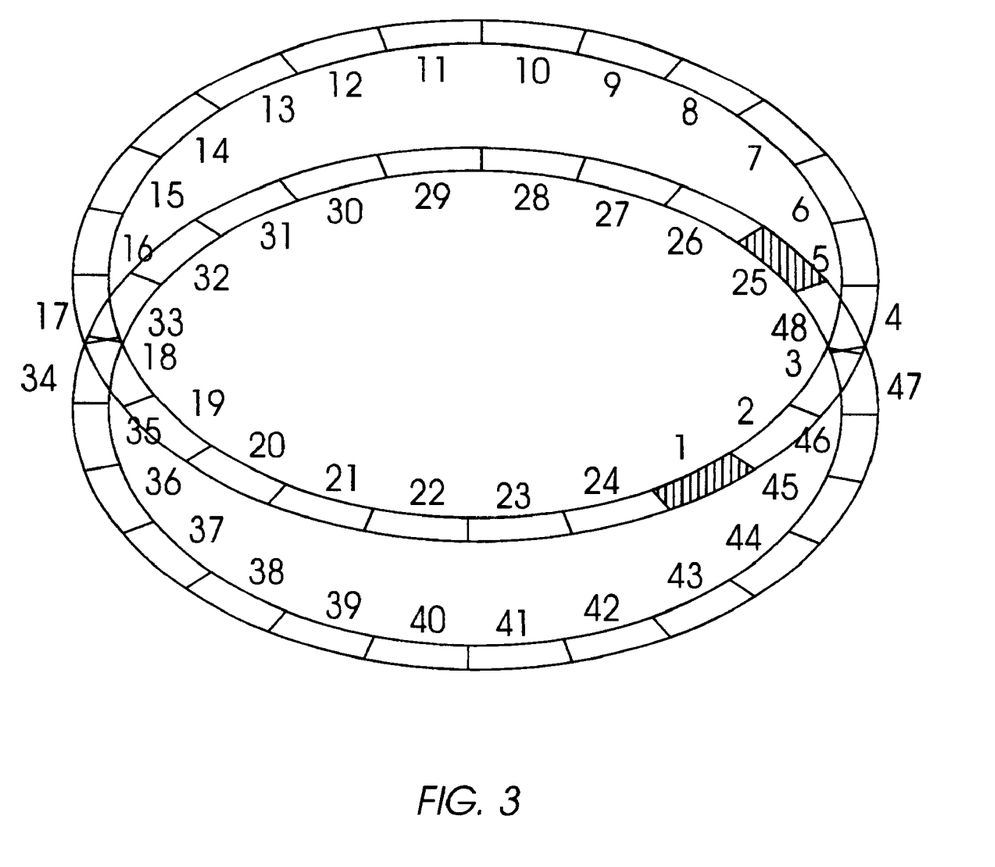
FIG. 3 shows a typical organization of data recorded on a cylinder in the disk drive shown in FIG. 1.

As shown in FIG. 3, the next logical block after the last block of track 1 is located on the first physical track at the outermost diameter of the next recording surface (accessed by recording head 2). Typically this first block of the second track is not located at the same relative angular position as the first block of the first track, but is offset by a small angular amount, as illustrated in FIG. 3. This offset is referred to as a track skew. The reason is to allow the disk drive time to switch from accessing data using recording head 1 to recording head 2, which takes a non-zero amount of time. This way, the drive can continuously access logically contiguous data without missing revolutions.

This data layout scheme continues until the last sector in the first track of the last recording surface is reached. The first track of each of the recording surface collectively form the first cylinder of the disk drive. The next logical block after the last sector of cylinder 1 is located on the second physical track of the first recording surface. Once again, this first sector is offset by a small angular amount from the first sector of the last track of the previous cylinder. This offset is referred to as a cylinder skew. The reason is the same as that for track skew. However, cylinder skew is typically larger than track skew because an actuator movement (a one cylinder seek) is involved.

Many of today's magnetic disk drives employ zone recording, where each recording surface is divided into concentric rings of recording areas or zones. The purpose is to increase the data storage efficiency of the disk drive. All the tracks within a zone have the same number of sectors per track. The outermost zone has the most number of sectors per track. As one moves from the outer-diameter of the disk towards the inner-diameter, the number of sectors per track decreases from zone to zone.

These disk drive parameters, namely, number of tracks per cylinder, number of zones, number of sectors per track in each zone, track skew, and cylinder skew, define the data layout geometry of a disk drive. These parameters affect the performance characteristics of a disk drive. The present invention determines these parameters by measuring certain performance characteristics of the disk drive.

Figure 4:
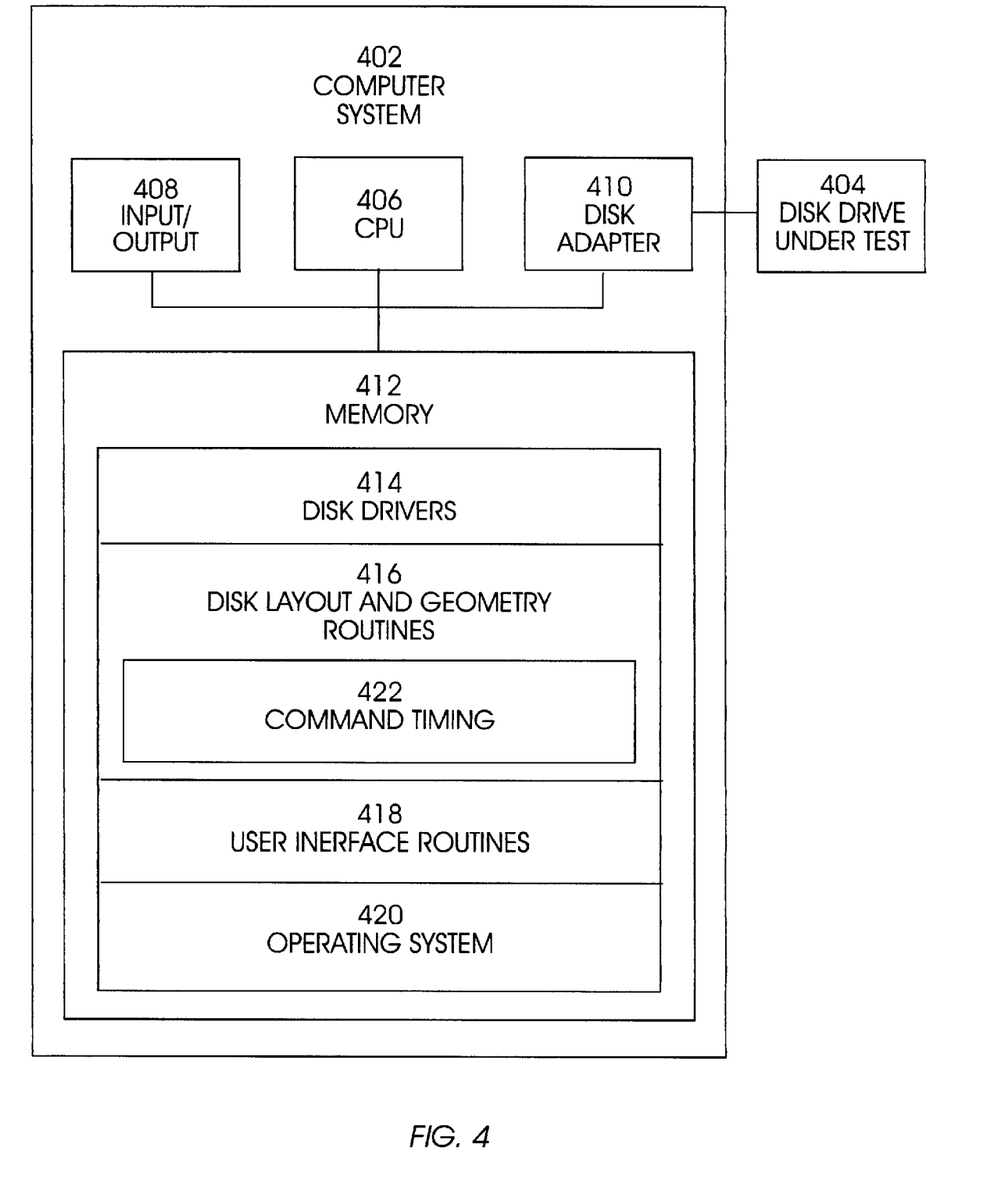
FIG. 4 is an exemplary block diagram of a system for determining the data layout geometry of a disk drive, according to the present invention.

A system 400 which determines the data layout geometry of a disk drive, according to the present invention, is shown in FIG. 4. System 400 includes computer system 402 and the disk drive 404, which is under test. Computer system 402 is typically a personal computer or workstation, but may be a minicomputer or mainframe computer. Computer system 402 includes processor (CPU) 406, input/output circuitry 408, disk drive adapter 410, and memory 412. CPU 406 executes program instructions in order to carry out the functions of the present invention. Typically, CPU 406 is a microprocessor, such as an INTEL PENTIUM® processor, but may also be a minicomputer or mainframe computer processor. Input/output circuitry 408 provides the capability to input data to, or output data from, computer system 402. For example, input/output circuitry may include input devices, such as keyboards, mice, touchpads, trackballs, scanners, etc., output devices, such as video adapters, monitors, printers, etc., and input/output devices, such as, modems, network adapters, etc. Disk adapter 410 provides computer system 402 with the capability to read, write and control disk drive 404. Typically, disk adapter 410 is an integrated drive electronics (IDE) based device, or a variation or enhancement thereof, such as enhanced IDE (EIDE) or ultra direct memory access (UDMA), or a small computer system interface (SCSI) based device, or a variation or enhancement thereof, such as fast-SCSI, wide-SCSI, fast and wide-SCSI, etc, or a fiber channel-arbitrated loop (FC-AL) device.

Memory 412 stores program instructions that are executed by, and data that is used by, CPU 406 to perform the functions of the present invention. Memory 412 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc. Memory 412 includes a plurality of blocks of program instructions, such as disk drivers 414, disk layout and geometry routines 416, user interface routines 418, and operating system 420. Disk drivers 414 provide a software interface between software and the hardware, such as disk adapter 410 and disk drive 404. Disk layout and geometry routines 416 perform a determination of the data layout of disk drive 404, according to the present invention. Disk layout and geometry routines 416 include command timing routine 422, which determines the elapsed time from when an I/O command is issued to disk drive 404 to when the command is completed. Typically, this timing is done by observing the system clock at the time the command is issued and again when the computer receives command complete indication. Alternatively, a hardware command timer may be provided instead.

User interface routines 418 provide interface between software and the user, such as keyboard input and screen output. Operating system 420 provides overall system functionality.

Disk drive 404 is typically a separate disk drive that is connected to computer system 402 for the purpose of determining the data layout geometry of disk drive 404. However, since memory 412 may include a disk drive, the data layout geometry of that disk drive may likewise be determined with the present invention. Thus, the present invention may be used to determine the data layout geometry of any disk drive connected to computer system 402, whether internal or external, and whether or not the disk drive contains data and/or program instructions used by computer system 402.

Figure 5:
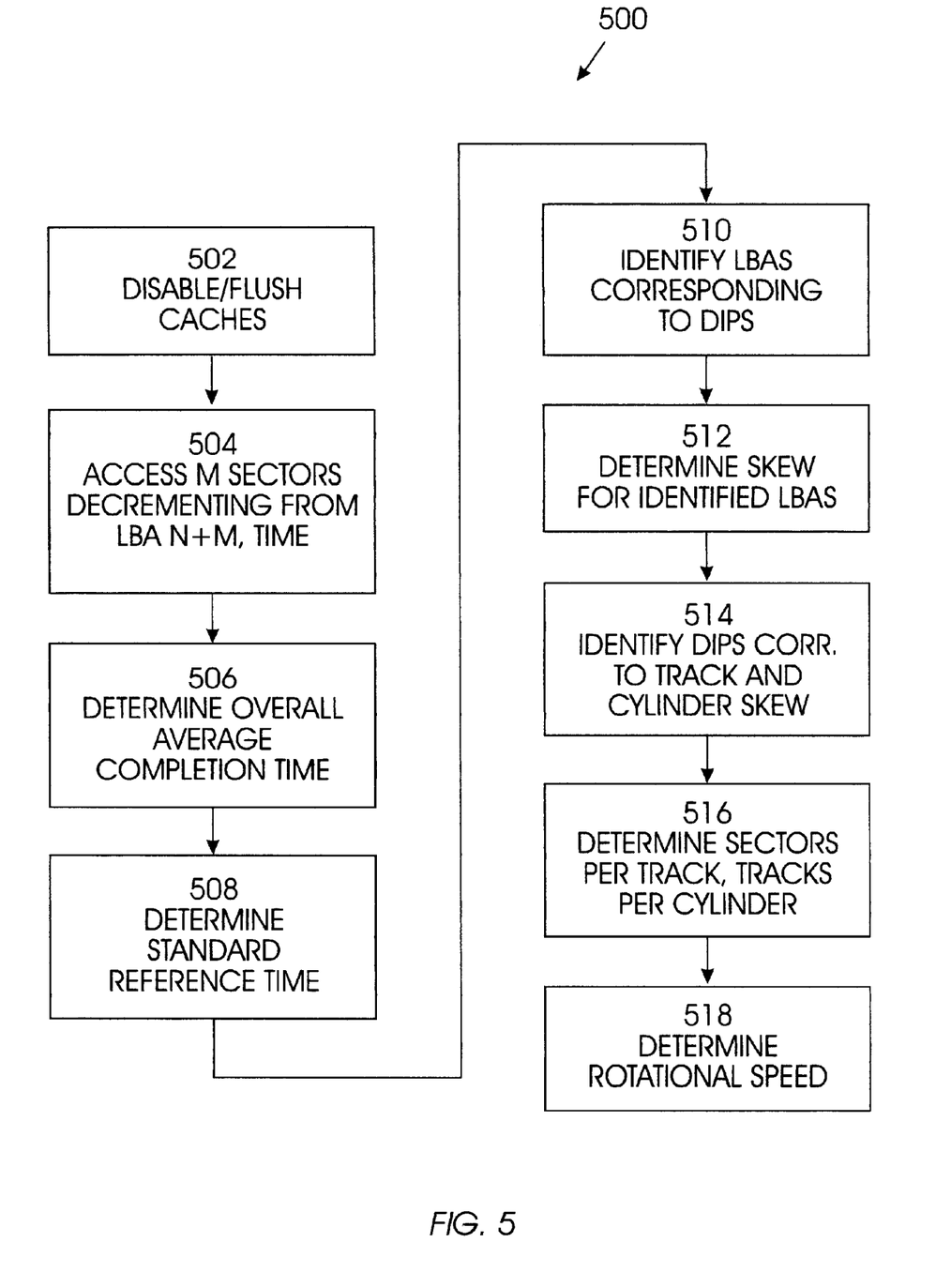
FIG. 5 is a flow diagram of a process for determining the data layout geometry of a disk drive, according to the present invention.

A process 500, for determining the data layout geometry of a disk drive, according to the present invention, is shown in FIG. 5. FIG. 5 is best viewed in conjunction with FIG. 6. The process begins with step 502, in which the appropriate caching is disabled and/or flushed. Any system caching in the computer must be bypassed. If the disk accesses to be used are write commands, the write cache in the disk drive is disabled. If the disk accesses to be used are read commands, and the disk drive under test does zero-latency reads, the read cache in the disk drive is disabled. If the disk accesses to be used are read commands, and the disk drive under test does not do zero-latency reads, the read cache is either flushed or disabled. If the disk drive supports a flush cache command, the read cache is flushed by issuing a flush cache command. If the disk drive does not support a flush cache command, flushing of the cache is simulated by issuing many read commands to the drive to many different LBA's that are far away from the LBA's used in the test pattern of the next step. This will ensure that the cache is filled with data that are not associated with the test pattern of the next step, guaranteeing that when the test pattern is issued, the data will not be found in the cache.

Either type of access, read or write, may be used. Thus, alternative embodiments of the processes use write operations, or combinations of read and write operations. Read operations are preferred as they do not alter the data recorded on the disk drive, but where the data may be altered, write operations may be used.

In step 504, the computer system accesses (reads or writes) a plurality of sectors, in sequentially decreasing order, starting from an initial sector, LBA N. The computer system accesses M sectors, starting at LBA N+M, and decrements down to LBA N+1. Thus, the sequence of accesses in step 504 is as follows:

Read LBA N+M for 1 sector
Read LBA N+M−1 for 1 sector
Read LBA N+M−2 for 1 sector
Read LBA N+M−3 for 1 sector
Read LBA N+M−4 for 1 sector
Read LBA N+4 for 1 sector
Read LBA N+3 for 1 sector
Read LBA N+2 for 1 sector
Read LBA N+1 for 1 sector For example, if N=0 and M=100, the pattern would look like:

Read LBA 100 for 1 sector
Read LBA 99 for 1 sector
Read LBA 98 for 1 sector
Read LBA 97 for 1 sector
Read LBA 96 for 1 sector
Read LBA 4 for 1 sector
Read LBA 3 for 1 sector
Read LBA 2 for 1 sector
Read LBA 1 for 1 sector Each command is issued to the disk drive by the computer which waits for its completion before the next command is issued. In other words, no command is queued in the disk drive. The computer issues the next command without any delay as soon as the current command is completed. The command completion time of each access is timed.

Figure 6:
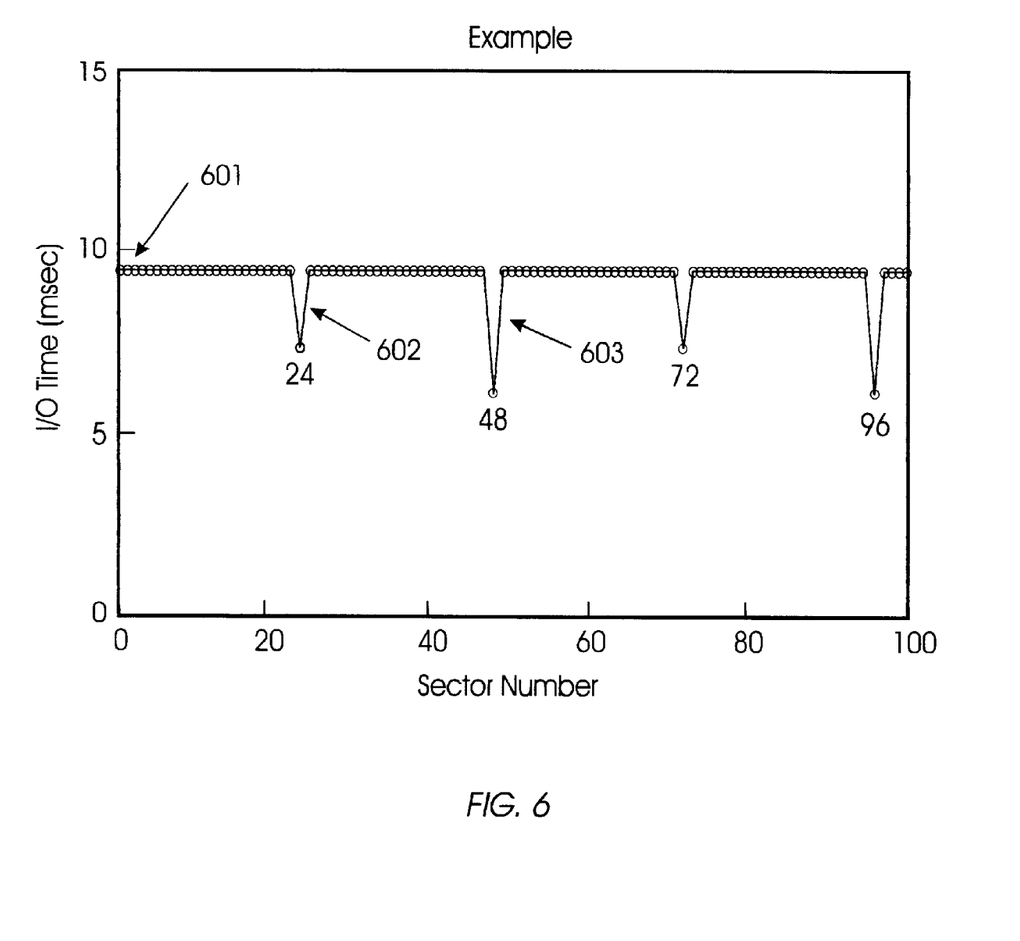
FIG. 6 is a plot of sector access times, showing the access time patterns that are used by the process shown in FIG. 5.

An exemplary timing pattern, for a disk drive having the data layout geometry shown in FIG. 3, is shown in FIG. 6. In this example, N=1 and M=100. As shown, the pattern formed is generally a straight line. Additionally, there are a plurality of dips, such as dip 602 and dip 603. For ease of identification, each dip in FIG. 6 is labeled with its associated LBA number. Except for the dips, each point is the time of one disk revolution minus one sector time, identified as 601 in FIG. 6. In other words, if S is the number of sectors per track and R is the time of one revolution, then the value of 601 is R*(S−1)/S. This time is termed the standard reference time. For the example given in FIG. 6, where R=10 msec and S=24, the standard reference time is 9.583 msec.

Each dip represents the last sector of a track, caused by either a track skew or a cylinder skew. The value of the dip from the standard reference time represents the amount of the skew. Thus, in FIG. 6, the dip labeled 602, with a value of 2.083 msec., represents the track skew, while the larger dip labeled 603, with a value of 3.333 msec., represents the cylinder skew.

In step 506, a time termed the overall average completion time is determined. This time is the average access completion time of all M sectors that have been accessed. This average time will be slightly lower than the standard reference time because of the dips caused by the skews. For the example shown in FIG. 6, this average value is 9.475 msec In step 508, the standard reference time is determined. This is done by determining the average command completion time of all those commands whose completion time deviates from the overall average time by less than some threshold. This threshold, which can be user specified, represents a value slightly less than the smallest skew found in today's disk drives. In the example of FIG. 6, and also for most of today's drives, a threshold of 1 msec. can be used. By excluding those command completion times that exceed this threshold, the dips are eliminated in calculating this average command completion time. Therefore, the average command completion time computed in this step is the desired standard reference time.

In step 510, the LBA's corresponding to the dips are identified. These are the LBA's whose command completion time deviates from the standard reference time by more than the threshold described in step 508.

In step 512, for each LBA identified in step 510, the skew is calculated by subtracting the command completion time of the LBA from the standard reference time. For example, in FIG. 6, the command completion time for LBA 24 is 7.5 msec. Subtracting that from the standard reference time of 9.583 msec yields a skew time of 2.083 msec. Likewise, for LBA 48, the command completion time is 6.25 msec and the skew time is 3.333 msec. In step 514, the dips corresponding to track and cylinder skew are identified. The dips corresponding to cylinder skew have greater skew time than the dips corresponding to track skew. For example, in FIG. 6, dip 602 corresponds to a track skew, and dip 603 corresponds to a cylinder skew. Thus, LBA 24, which is associated with dip 602, is the last sector of a track and is the sector immediately preceding the skew between the track including LBA 24 and the next track. Likewise, LBA 48, which is associated with dip 603, is the last sector of a cylinder, and is the sector immediately preceding the skew between the cylinder including LBA 48 and the next cylinder.

In step 516, the sectors per track and tracks per cylinder of the disk drive are determined. The distance, in sectors, between the LBA's associated with dips, is the number of sectors per track. The number of tracks between cylinder skews is the number of tracks per cylinder.

In step 518, the rotational speed of the drive is determined. The rpm of the drive is given by the equation:

$$\text{rpm} = 60 \text{ sec.} \times (S-1)/(S \times T),$$

where S is the number of sectors per track and T is the standard reference time, both determined in above. For the example of FIGS. 6, since T=9.583 msec. and S=24, the rpm=60×(24−1)/9.583×24=6000.

To determine the data geometry layout of a disk at the outer diameter, process 500 is performed using N=0 and M being a number larger than the largest number of sectors per cylinder in typical modern disk drives, such as 8000.

Figure 7:
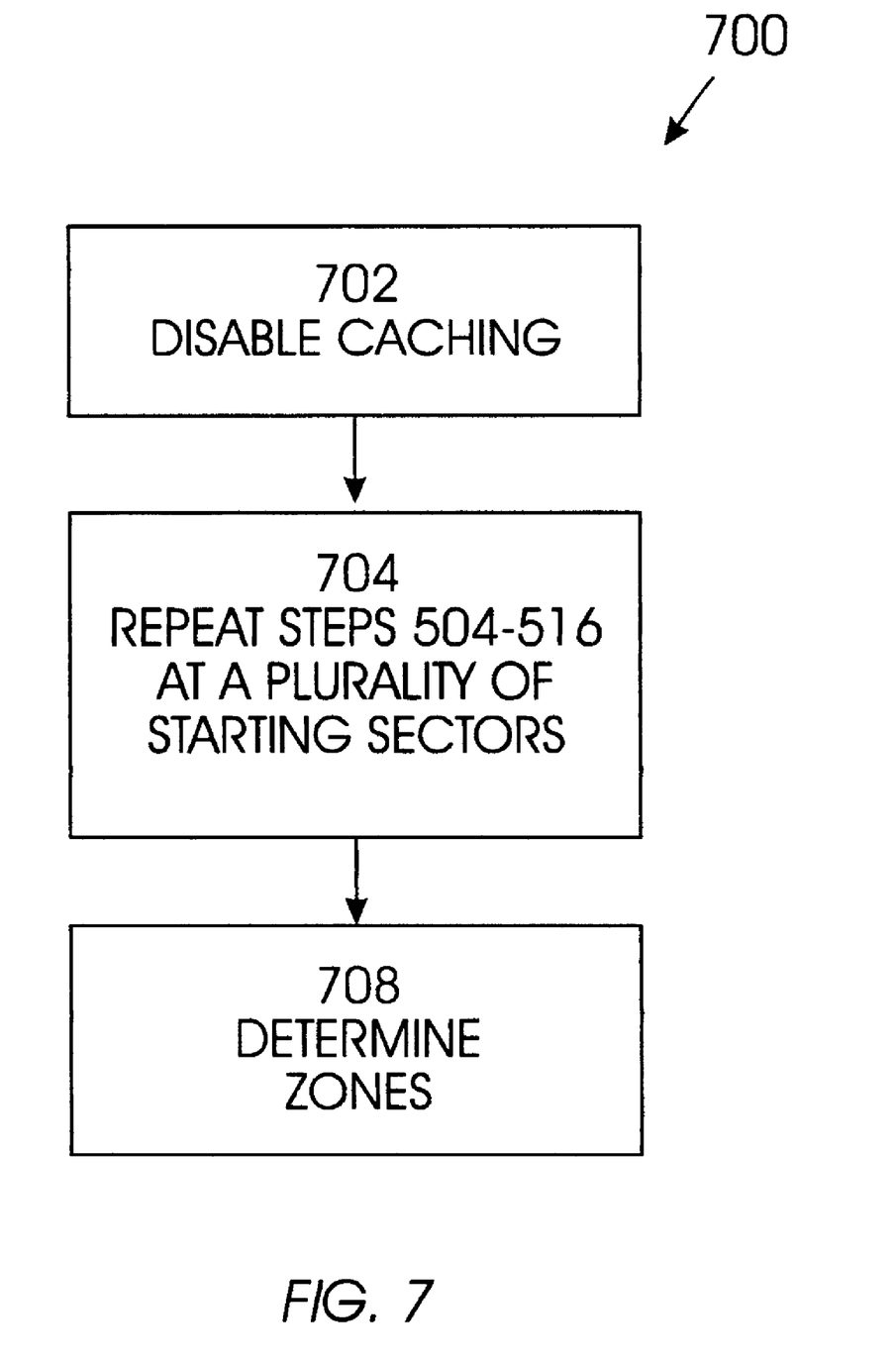
FIG. 7 is a flow diagram of an alternative process for determining the zoning information of a disk drive, according to the present invention.

A process 700 for determining the zoning information of the disk drive is shown in FIG. 7. Essentially, the disk drive is sampled, using steps 504–516 of FIG. 5, at a plurality of starting sectors through out the drive. Process 700 begins with step 702, in which caching is disabled and/or flushed, as in step 502 of FIG. 5. In step 704, steps 504–516 are performed for a plurality of starting sectors N. Sampling is accomplished by selecting LBA N to be at various part of the disk drive. For example, if W is the maximum LBA of the entire drive, repeat steps 504–516 using N from the set {0, W/100, 2W/100, 3/100, . . . , 99W/100}. Since the number of tracks per cylinder is fixed throughout a drive, and is determined in the first performance of process 500, it does not need to be determined here again. For zoning information, one is only interested in the number of sectors per track for each zone. Therefore, a smaller value of M can be selected than in process 500.

In step 706, the zone layout of the disk drive is determined by determining the number of sectors per track for each sample value of N.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of determining a data layout geometry of a portion to be mapped of a disk drive, comprising the steps of:
   (A) accessing a totality of sectors within the portion of the disk drive, in sequentially decreasing order, starting from an initial sector;
   (B) measuring a completion time for each access; and
   (C) determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

2. The method of claim 1, wherein the determining step comprises the steps of:
   identifying sectors immediately preceding track and cylinder skews; and
   determining a number of sectors per track and a number of tracks per cylinder based on the identified sectors.

3. The method of claim 2, wherein the identifying step comprises the steps of:
   determining an average completion time of all measured access times;
   identifying all measured access times that are less than the average completion time by at least a predefined threshold;
   determining a standard completion time that is an average of all measured access times, excluding those measured access times that are less than the average completion time by at least the predefined threshold; and
   identifying logical block addresses corresponding to the measured access times that are less than the average completion time by at least the predefined threshold.

4. The method of claim 3, wherein the identifying step further comprises the steps of:
   determining a skew time for each identified logical block address by subtracting the measured access time for the logical block address from the standard reference time; and
   identifying each skew time as either a track skew or a cylinder skew based on the size of the skew time.

5. The method of claim 4, wherein the step of determining a number of sectors per track and a number of tracks per cylinder comprises the steps of:
   determining a number of sectors per track based on a sector distance between identified sectors immediately preceding track skews; and
   determining a number of tracks per cylinder based on a number of tracks between identified sectors immediately preceding cylinder skews.

6. The method of claim 5, further comprising the step of:
   determining a rotational speed of the disk drive based on the determined number of sectors per track and the determined standard reference time.

7. The method of claim 5, wherein the step of determining the rotational speed of the disk drive comprises the step of:
   determining the rotational speed of the disk drive in accordance with:

$$\text{rpm}=60\times(S-1)/(S\times T),$$

where rpm is the rotational speed of the disk drive, S is the number of sectors per track and T is the standard reference time.

8. The method of claim 1, further comprising the step of:
   repeatedly performing steps (A) through (C), each performance using a different initial sector whereby a zone layout of the portion of the disk drive is determined.

9. The method of claim 8, wherein the repeatedly performing step further comprises the step of:
   selecting an initial sector to be used for each performance of the measuring step from the set {0, W/X, 2W/X, 3W/X, . . . , (X−1)W/X)}, wherein W is the maximum logical block address of the disk drive and X is a positive integer.

10. A system for determining a data layout geometry of a portion to be mapped of a disk drive, comprising:
    a processor;
    a disk drive adapter coupling the processor to the disk drive; and
    a memory containing program instructions, executable by the processor to perform the steps of:
    (A) accessing a totality of sectors within the portion of the disk drive, in sequentially decreasing order, starting from an initial sector;
    (B) measuring a completion time for each access; and
    (C) determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

11. The system of claim 10, wherein the program instructions for performing the determining step comprise program instructions for performing the steps of:
    identifying sectors immediately preceding track and cylinder skews; and
    determining a number of sectors per track and a number of tracks per cylinder based on the identified sectors.

12. The system of claim 11, wherein the program instructions for performing the identifying step comprise program instructions for performing the steps of:

determining an average completion time of all measured access times;

identifying all measured access times that are less than the average completion time by at least a predefined threshold;

determining a standard completion time that is an average of all measured access times, excluding those measured access times that are less than the average completion time by at least the predefined threshold; and identifying logical block addresses corresponding to the measured access times that are less than the average completion time by at least the predefined threshold.

13. The system of claim 12, wherein the program instructions for performing the identifying step further comprise program instructions for performing the steps of:

determining a skew time for each identified logical block address by subtracting the measured access time for the logical block address from the standard reference time; and identifying each skew time as either a track skew or a cylinder skew based on the size of the skew time.

14. The system of claim 13, wherein the program instructions for performing the the step of determining a number of sectors per track and a number of tracks per cylinder comprise program instructions for performing the steps of:

determining a number of sectors per track based on a sector distance between identified sectors immediately preceding track skews; and determining a number of tracks per cylinder based on a number of tracks between identified sectors immediately preceding cylinder skews.

15. The system of claim 14, wherein the program instructions further comprise program instructions for performing the step of:

determining a rotational speed of the disk drive based on the determined number of sectors per track and the determined standard reference time.

16. The system of claim 15, wherein the program instructions for determining the rotational speed of the disk drive comprise program instructions for performing the step of:

determining the rotational speed of the disk drive in accordance with:

$$rpm = 60 \times (S-1)/(S \times T),$$

where rpm is the rotational speed of the disk drive, S is the number of sectors per track and T is the standard reference time.

17. The system of claim 10, wherein the memory further contains program instructions for performing the step of:

repeatedly performing steps (A) through (C), each performance using a different initial sector, whereby a zone layout of the portion of the disk drive is determined.

18. The system of claim 17, wherein the program instructions for performing the repeated performing step further comprise program instructions for performing the steps of:

selecting an initial sector to be used for each performance of the measuring step from the set {0, W/X, 2W/X, 3W/X, . . . , (X−1)W/X)}, wherein W is the maximum logical block address of the disk drive and X is a positive integer.

19. A computer program product for determining a data layout geometry of a portion to be mapped of a disk drive, comprising:

a computer readable medium;

computer program instructions, recorded on the computer readable medium, executable by a processor coupled to the disk drive, for performing the steps of:

(A) accessing a totality of sectors within the portion of the disk drive, in sequentially decreasing order, starting from an initial sector;

(B) measuring a completion time for each access; and (C) determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

20. The computer program product of claim 19, wherein the computer program instructions for performing the determining step comprise computer program instructions for performing the steps of:

identifying sectors immediately preceding track and cylinder skews; and determining a number of sectors per track and a number of tracks per cylinder based on the identified sectors.

21. The computer program product of claim 20, wherein the computer program instructions for performing the identifying step comprise computer program instructions for performing the steps of:

determining an average completion time of all measured access times;

identifying all measured access times that are less than the average completion time by at least a predefined threshold;

determining a standard completion time that is an average of all measured access times, excluding those measured access times that are less than the average completion time by at least the predefined threshold; and identifying logical block addresses corresponding to the measured access times that are less than the average completion time by at least the predefined threshold.

22. The computer program product of claim 21, wherein the computer program instructions for performing the identifying step further comprise computer program instructions for performing the steps of:

determining a skew time for each identified logical block address by subtracting the measured access time for the logical block address from the standard reference time; and identifying each skew time as either a track skew or a cylinder skew based on the size of the skew time.

23. The computer program product of claim 22, wherein the computer program instructions for performing the the step of determining a number of sectors per track and a number of tracks per cylinder comprise computer program instructions for performing the steps of:

determining a number of sectors per track based on a sector distance between identified sectors immediately preceding track skews; and determining a number of tracks per cylinder based on a number of tracks between identified sectors immediately preceding cylinder skews.

24. The computer program product of claim 23, wherein the computer program instructions further comprise computer program instructions for performing the step of:

determining a rotational speed of the disk drive based on the determined number of sectors per track and the determined standard reference time.

25. The computer program product of claim 24, wherein the computer program instructions for determining the rotational speed of the disk drive comprise computer program instructions for performing the step of:

determining the rotational speed of the disk drive in accordance with:

$$rpm = 60 \times (S-1)/(S \times T),$$

where rpm is the rotational speed of the disk drive, S is the number of sectors per track and T is the standard reference time.

26. The computer program product of claim 19, further comprising computer program instructions for performing the step of:

repeatedly performing steps (A) through (C), each performance using a different initial sector, whereby a zone layout of the portion of the disk drive is determined.

27. The computer program product of claim 26, wherein the computer program instructions for performing the repeated performing step further comprise computer program instructions for performing the steps of:

selecting an initial sector to be used for each performance of the measuring step from the set {0, W/X, 2W/X, 3W/X, ..., (X−1)W/X)}, wherein W is the maximum logical block address of the disk drive and X is a positive integer.

28. A system for determining a data layout geometry of a portion to be mapped of a disk drive, comprising:

(A) means for accessing a totality of sectors within the portion of the disk drive, in sequentially decreasing order, starting from an initial sector;

(B) means for measuring a completion time for each access; and (C) means for determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

29. The system of claim 28, wherein the determining means comprises:

means for identifying sectors immediately preceding track and cylinder skews; and means for determining a number of sectors per track and a number of tracks per cylinder based on the identified sectors.

30. The system of claim 29, wherein the identifying means comprises:

means for determining an average completion time of all measured access times;

means for identifying all measured access times that are less than the average completion time by at least a predefined threshold;

means for determining a standard completion time that is an average of all measured access times, excluding those measured access times that are less than the average completion time by at least the predefined threshold; and means for identifying logical block addresses corresponding to the measured access times that are less than the average completion time by at least the predefined threshold.

31. The system of claim 30, wherein the identifying means further comprises:

means for determining a skew time for each identified logical block address by subtracting the measured access time for the logical block address from the standard reference time; and means for identifying each skew time as either a track skew or a cylinder skew based on the size of the skew time.

32. The system of claim 31, wherein the means for determining a number of sectors per track and a number of tracks per cylinder comprises:

means for determining a number of sectors per track based on a sector distance between identified sectors immediately preceding track skews; and means for determining a number of tracks per cylinder based on a number of tracks between identified sectors immediately preceding cylinder skews.

33. The system of claim 32, further comprising:

means for determining a rotational speed of the disk drive based on the determined number of sectors per track and the determined standard reference time.

34. The system of claim 33, wherein the means for determining the rotational speed of the disk drive comprises:

means for determining the rotational speed of the disk drive in accordance with:

$$rpm = 60 \times (S-1)/(S \times T),$$

where rpm is the rotational speed of the disk drive, S is the number of sectors per track and T is the standard reference time.

35. The system of claim 28, further comprising:

means for determining a zone layout of the portion of the disk drive comprising means for repeatedly operating means (A) through (C), each operation using a different initial sector.

36. The system of claim 35, wherein the means for determining a zone layout of the disk drive further comprises:

means for selecting an initial sector to be used for each performance of the measuring step from the set {0, W/X, 2W/X, 3W/X, ..., (X−1)W/X)}, wherein W is the maximum logical block address of the disk drive and X is a positive integer.

* * * * *